US012617992B1

(12) United States Patent
Birudula et al.

(10) Patent No.: US 12,617,992 B1
(45) Date of Patent: May 5, 2026

(54) NANOFLUID FOR HEAT TRANSFER, METHOD FOR PRODUCING A NANOFLUID AND METHOD FOR RECYCLING OF NANOPARTICLES OF A NANOFLUIDS AND USES OF THE NANOFLUID

(71) Applicant: Synano B.V., Delft (NL)

(72) Inventors: Srikanth Birudula, Delft (NL); Alexander Korobko, Delft (NL); Sana Fateh, Delft (NL)

(73) Assignee: Synano B.V., Delft (NL)

( * ) Notice: Subject to any disclaimer, the term of this patent is extended or adjusted under 35 U.S.C. 154(b) by 0 days.

(21) Appl. No.: 19/080,334

(22) Filed: Mar. 14, 2025

(51) Int. Cl.
*C09K 5/10* (2006.01)
*B82Y 40/00* (2011.01)

(52) U.S. Cl.
CPC ................ *C09K 5/10* (2013.01); *B82Y 40/00* (2013.01)

(58) Field of Classification Search
CPC ... C09K 5/10; C09K 5/08; C09K 5/14; C09K 23/00; C09K 23/17
See application file for complete search history.

(56) References Cited

U.S. PATENT DOCUMENTS

| | | | | |
|---|---|---|---|---|
| 12,122,954 | B2 | 10/2024 | Agiral et al. | |
| 2004/0206491 | A1* | 10/2004 | Davidson | C09K 5/10 165/185 |
| 2012/0032543 | A1* | 2/2012 | Chakraborty | C10M 125/02 977/734 |
| 2013/0285781 | A1* | 10/2013 | Yin | H01F 27/12 977/773 |
| 2019/0276673 | A1* | 9/2019 | Pyrgioti | H01B 3/20 |
| 2023/0416583 | A1* | 12/2023 | Agiral | C09K 23/002 |

OTHER PUBLICATIONS

Zhengyong Huang, et al., "Electrical and thermal properties of insulting oil-based nanofluids: a comprehensive overview," IET Journals, The Institution of Engineering and Technology, 2019, vol. 2, pp. 27-40.

Furkan Ahmad, et al., "State-of-Art in Nano-Based Dielectric Oil: A Review," IEEE Access, vol. 7, 2019, pp. 13396-13410.

Daniel Amin, et al., "Recent Progress and Challenges in Transformer Oil Nanofluid Development: A Review on Thermal and Electrical Properties," IEEE Access, vol. 7, 2019, pp. 151422-151438.

V. Sridhara, et al., "Effect of Nanoparticles on Thermal Properties Enhancement in Different Oils—A Review," Oct. 12, 2015, pp. 399-424.

Partial European Search Report of EP Application No. 25163876 date Jul. 29, 2025.

Ali Arif et al., "Enhancing AC Breakdown Voltage of Insulating Oils Incorporating A1203 Nanoparticles," 2023 International Conference on Power, Instrumentation, Energy and Control (Piecon), IEEE, Feb. 10, 2023, pp. 1-5, XP034324452.

Hou Xianjun et al., "An experimental study and mechanism analysis on improving dispersion stability performance of A1203 nanoparticles in base synthetic oil under various mixing conditions," Journal of Nanoparticle Research, Springer Netherlands, Dordrecht, vol. 23, No. 4, Apr. 1, 2021, XP037521131.

* cited by examiner

*Primary Examiner* — Jane L Stanley
(74) *Attorney, Agent, or Firm* — Dentons US LLP; Derek Auito

(57) ABSTRACT

A nanofluid for heat transfer that includes nanoparticles, a dielectric oil in which the nanoparticles are dispersed, and a stabilizer, wherein the nanoparticles are surface-modified by the stabilizer, a mass ratio of stabilizer to nanoparticles ranges from about 0.01 to about 110, and a molar mass of the stabilizer is less than 300 g/mol.

12 Claims, 3 Drawing Sheets

NANOFLUID FOR HEAT TRANSFER, METHOD FOR PRODUCING A NANOFLUID AND METHOD FOR RECYCLING OF NANOPARTICLES OF A NANOFLUIDS AND USES OF THE NANOFLUID

TECHNICAL FIELD

The present disclosure relates to a nanofluid for heat transfer applications. In particular, the nanofluid is an oil-based nanofluid. The present disclosure also relates to a method of producing the nanofluids a well as a method of recycling nanoparticle in the nanofluid and redispersing the nanoparticles in another dielectric oil. Additionally, the present disclosure relates to various uses of the inventive nanofluid.

BACKGROUND

Nano dielectric oils are nanofluids containing nanoparticles of varying sizes, shapes, concentrations, and dispersed within a base dielectric oil. This approach is aimed at improving the performance of conventional oils across various high-demand applications, such as immersion cooling systems and other applications, where heat transfer and dielectric properties are critical.

Advantages of nano dielectric oils are manifold. For example, they exhibit a superior thermal conductivity: Metal and metal oxide nanoparticles exhibit significantly higher thermal conductivity than base oils, which, when added to the oil, boosts the overall thermal conductivity of the nanofluid. Furthermore, heat transfer is enhanced over the dielectric oil: In low-viscosity oils, the random movement of nanoparticles contributes to heat transfer and reduces the risk of phase separation. Additionally, an increased breakdown voltage is to be expected: The presence of nanoparticles enhances the dielectric strength, making these fluids ideal for electrical applications. Furthermore, nanoparticles moving near solid surfaces break down the thermal boundary layer, facilitating more efficient heat exchange between the oil and the contact surface and finally improving interfacial heat exchange. Another advantage is that the so called Soret effect in nano dielectric oils further supports heat dissipation, particularly in applications with varying temperature zones.

Despite these advantages, the development of stable nano dielectric oils involves challenges related to stability, compatibility, viscosity, and interfacial properties.

As a main challenge in the art of nanofluids, achieving stable dispersions with minimal sedimentation remains challenging due to natural differences in density, structure, and polarity between nanoparticles and the dielectric oil. This can lead to aggregation and sedimentation of nanoparticles, reducing the nanofluid's effectiveness. Another challenge is the compatibility: Limited interactions between nanoparticles and oils can cause performance degradation, often necessitating surface modifications or stabilizers. Furthermore, viscosity control might be difficult: Higher nanoparticle concentrations can increase viscosity, requiring additional pumping power. Balancing thermal conductivity with manageable viscosity is essential. Moreover, an interface sensitivity is a further challenge: Effective energy transfer depends on the nanoparticle-oil interface, which can introduce thermal resistance due to limited affinity and structural differences.

While nano dielectric oils have shown great potential, they remain largely under academic and small experimental development, with few patent applications filed but limited commercial adoption.

Therefore, it is an objective of the present disclosure to provide improvements with respect to the above-mentioned challenges; in particular with respect to stability.

SUMMARY OF THE INVENTION

This disclosure is intended as only a general description and should not be interpreted as a limitation of the disclosure in any way. Moreover, this disclosure should be read and understood as it would be by one of ordinary skill in the art in the light of the entire disclosure. This disclosure describes nanofluid for heat transfer applications, methods for producing a nanofluid and for recycling of nanoparticles of nanofluids, and uses of the nanofluid.

An aspect of the present disclosure is directed to a nanofluid for heat transfer includes nanoparticles; a dielectric oil in which the nanoparticles are dispersed; and a stabilizer, wherein the nanoparticles are surface-modified by the stabilizer and a mass ratio of stabilizer to nanoparticles ranges from about 0.01 to about 110 and a molar mass of the stabilizer is less than 300 g/mol.

In some embodiments, the stabilizer is attached to the nanoparticles by a chemical bond and/or as a surfactant.

In some embodiments, the nanoparticles are selected from the group consisting of alumina, titania, silicon dioxide, graphene, graphene oxide, carbon nanotubes, boron nitride, manganese dioxide and combinations thereof.

In some embodiments, a concentration of the nanoparticles ranges from about 0.0001 Ma.-% to about 10% Ma.-% with respect to a total mass of the nanofluid.

In some embodiments, the nanoparticles are attached to an additional organic surface modifier, wherein the additional organic surface modifier is chemically bond to the nanoparticles, wherein optionally the additional organic surface modifier comprises a monomeric and oligomeric form of acrylic acid.

In some embodiments, the stabilizer is selected from the group consisting of glycol ethers, such as dipropylene glycol n-butyl ether (DPnB); organic solvents comprising an OH-group; fatty alcohols, such as 1-octanol, 1,2 octanediol, and hexanol; fatty acids, such as lauric acid; hydrophilic-hydrophobic molecules and a combination thereof.

In some embodiments, the stabilizer being functionalized to the nanoparticles is obtainable by method including the steps of: (a1) mixing the nanoparticles and the stabilizer in a stabilizer to nanoparticles mass ratio ranging from about 0.01 to about 110 and wherein the stabilizer has a molecular mass of less than 300 g/mol; and (a2) evaporating excess stabilizer to obtain nanoparticles to which the stabilizer is attached; or (b1) adding stabilizer to a dielectric oil; (b2) adding and dispersing nanoparticles to the composition of (b1) and dispersing the nanoparticles to obtain nanoparticles to which the stabilizer is attached, wherein a mass ratio of stabilizer to nanoparticles is controlled to be ranging between about 0.01 to about 110 and a molar mass of the stabilizer is less than 300 g/mol.

In some embodiments, the dielectric oil is selected from the group consisting of mineral oils, paraffin oils, vegetable oils, poly-alpha-olefins (PAO), silicone oils, natural esters, synthetic esters, such as biobased or otherwise, synthetic oils, fluorocarbon oils and combinations thereof; and/or wherein a volume content of the dielectric oil ranges between about 30 Vol.-% to about 99 Vol.-%, optionally about 50 Vol.-% to about 99 Vol.-%, with respect to a total volume of the nanofluid.

In some embodiments, a viscosity reducing agent is dispersed in the nanofluid, wherein the viscosity reducing agent is optionally selected from the group consisting of a glycol ether, such as dipropylene glycol n-butyl ether (DPnB), a vegetable ester, a synthetic ester or a combination thereof, wherein further optionally the viscosity reducing agent is capable of modifying the flash point of the dielectric oil.

In some embodiments, the viscosity reducing agent is present in a content ranging from about 0.1 Ma.-% to about 30 Ma.-% with respect to a total mass of the nanofluid.

In some embodiments, the average size of the nanoparticles ranges between about 1 nm and about 2000 nm, optionally between about 10 and about 200 nm.

In some embodiments, an antioxidant and/or a corrosion inhibitor is included.

According to another aspect of the present disclosure, a method for forming a nanofluid according to any one of the foregoing embodiments includes: (a1) mixing the nanoparticles and the stabilizer in a stabilizer to nanoparticles mass ratio ranging from about 0.01 to about 110 and the stabilizer has a molar mass of less than 300 g/mol; and (a2) evaporating excess stabilizer to obtain nanoparticles to which the stabilizer is attached; or (b1) adding stabilizer to a dielectric oil; (b2) adding and dispersing nanoparticles to the composition of (b1) and dispersing the nanoparticles to obtain nanoparticles to which the stabilizer is attached, wherein a mass ratio of stabilizer to nanoparticles is controlled to be ranging between about 0.01 to about 110.

According to another aspect of the present disclosure, a method for recycling a nanofluid according to any one of the foregoing embodiments includes the steps of: (a) destabilizing the nanoparticles dispersed in the dielectric oil; (b) extracting the destabilized nanoparticles from the dielectric oil; and (c) preparing a new nanofluid with the extracted particles in step (b).

According to another aspect of the present disclosure, a use of a nanofluid according to any one of the foregoing embodiments includes as a coolant for a server or a data center, such as immersion cooling of a data center severs and/or direct chip cooling applications, as a coolant for power electronics, as a coolant for an engine cooling system, as a coolant in a heat exchanger, as a coolant in a solar thermal power plant, as a coolant in a transformer, or as a coolant in a high-performance computing system, or as immersion cooling of batteries, such as electric vehicle batteries and/or electrical power storage batteries, and/or power trains.

The nanofluid according to embodiments of the present disclosure have proven to be excellent in terms of stability in view of the nanoparticles staying dispersed in the dielectric oil. The nanoparticles in the nanofluids of the present disclosure also have a sufficient interaction with the dielectric oil enabling this stability. Therefore, they are also compatible with the oil in which they are dispersed. In certain embodiments, the viscosity for higher nanoparticle concentrations can even be reduced compared to the base dielectric oil. Therefore, the nanofluids according to the present disclosure have enhanced performance characteristics for industrial applications as further explained hereinbelow.

It goes without saying that the nanofluids have improved heat transfer characteristics compared with the base dielectric oil. Besides the common advantages nanofluids comprising dielectric oils and nanoparticles dispersed therein as described above, the nanofluid of the present disclosure, therefore, also solves existing challenges. Also, the nanoparticles in the nanofluid increase the dielectric strength of the dielectric oils. Therefore, they nanofluids of the present disclosure provide for a high breakdown voltage.

Furthermore, surprisingly, the nanoparticles in the nanofluid of the present disclosure can be easily recycled from the nanofluid after it has been used and successfully be redispersed in a new dielectric oil.

In addition, the characteristics of the nanofluid according to the present disclosure, such as its stability, make the nanofluid viable for a commercial use as a coolant for various applications described herein.

These effects and other effects will more specifically become apparent from the detailed description and the examples.

BRIEF DESCRIPTION OF THE FIGURES

The figures depict exemplified results of the nanofluids according to the present disclosure which are not to be construed as limiting.

DEFINITIONS

Figure 1:
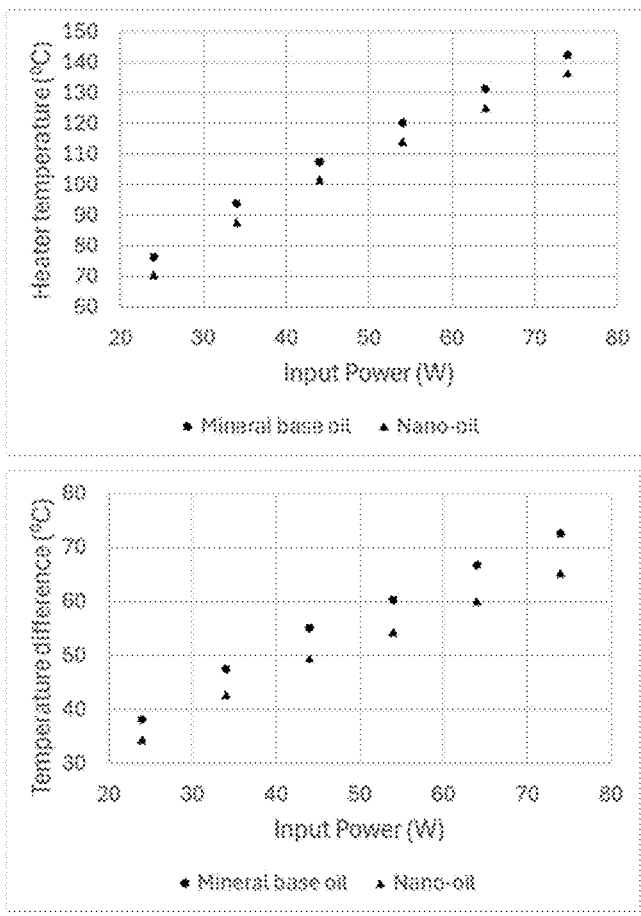
FIG. 1 shows a comparison of heater temperatures versus input power using the nanofluid according to Example 1 of the present disclosure versus its base oil for heat transfer (upper graph) and a comparison of temperature differences versus input power using the nanofluid according to Example 1 of the present disclosure versus its based oil (lower graph).

Unless stated or defined otherwise, all terms used herein have the typical meaning known to the skilled person. In accordance with this, some terms used herein are defined in the following.

The terms "nano dielectric oil", "nano-oil" and "nanofluid" are used interchangeably herein. In particular, a nanofluid is to be understood broadly and, in the context of the present disclosure, refers to a dielectric oil in which nanoparticles are dispersed, wherein the nanoparticles are at least surface-modified by a stabilizer and a mass ratio of stabilizer to nanoparticles is ranging from about 0.01 to about 110 and the stabilizer has a molar mass of less than 300 g/mol. The nanofluid may or may not comprise further components such as a viscosity reducing agent as further specified herein.

As used herein, the expression "less than 300 g/mol" does not encompass values of exactly 300 g/mol or higher. Furthermore, the expression "less than 300 g/mol" does not encompass the value 0 either and means that a stabilizer (with a molar mass of higher than 0 and lower than 300 g/mol) is present. In other words, "less than 300 g/mol" is understood as "more than 0 g/mol to less than 300 g/mol".

A "viscosity modifier" is a term used in the art, and is e.g. known from Thong, D., Hutchinson, P. A., Wincierz, C., Schimmel, T. (2014). Viscosity Modifiers. In: Mang, T. (eds) Encyclopedia of Lubricants and Lubrication. Springer, Berlin, Heidelberg. https://doi.org/10.1007/978-3-642-22647-2_154, and known to change the viscosity of a liquid. "Viscosity reducing agent" is a sub-category of a viscosity modifier; the term being for example known from Zhang F, Zhang Q, Zhou Z, Sun L, Zhou Y. Study on the Effect of Different Viscosity Reducers on Viscosity Reduction and Emulsification with Daqing Crude Oil. Molecules. 2023 Feb. 1; 28(3):1399. doi: 10.3390/molecules28031399. PMID: 36771063; PMCID: PMC9920648, and broadly understood in that it is capable of reducing the viscosity of a nanofluid, in particular of dielectric oils with nanoparticles dispersed therein. Further specific examples of a viscosity modifier are stated hereinbelow.

As used herein, the term "dielectric oil" or "base oil" is to be construed broadly and understood as an insulating oil having a high dielectric strength. In addition, the dielectric oil is typically a nonpolar liquid. The dielectric oil is typically stable at high temperatures. Typically, they are used as a coolant in transformers or other applications as disclosed herein. For example, these oils are commonly employed as coolants in transformers and similar electrical equipment, where they serve both to insulate and to dissipate heat. Other potential applications are discussed in further detail herein. The formulation of a dielectric oil encompasses a wide range of chemical types, including but not limited to: mineral oils, synthetic hydrocarbons, ester-based oils, silicone-based oils, and fluorinated liquids or mixtures thereof. Also, such dielectric oils are typically stable at high temperatures, such as at 180° C. and up to 200° C. Specific examples for dielectric oils are disclosed herein.

Whenever reference is made to the "thermal conductivity" herein, said thermal conductivity may be measured using Thermtest Transient Hot-Wire (THW-L2) which is a portable thermal conductivity meter for measurement of liquids adhering to ASTM D7896-19.

Whenever reference is made to the "kinematic viscosity" herein, said viscosity may be measured according to ASTM D445 (using a CANNON-FENSKE VISCOMETER TUBE).

Whenever reference is made to the "density" herein, said density may be measured according to ASTM D4052 (using an Anton Paar Digital density meter).

The term breakdown voltage, as used herein, is understood broadly and refers to the voltage at which an insulating material, such as dielectric oil, fails and allows electrical conduction to occur. This critical property is a key performance metric for dielectric oils and other insulating fluids. This term is e.g. known to the skilled person from "Definitions of breakdown voltage and dielectric strength," in Journal of the A.I.E.E., vol. 48, no. 6, pp. 484-484, June 1929, doi: 10.1109/JAIEE.1929.6537721. Whenever reference is made to the "breakdown voltage", said breakdown voltage may be determined according to IEC 60156 (using a Megger Automatic Oil Breakdown Tester OTS80AF-EU).

As used herein, in the context of nanofluids, the term "flash point" refers to the lowest temperature at which the fluid can form an ignitable mixture with air when exposed to a flame or spark. Whenever reference is made to the "flashpoint" herein, said flashpoint may be determined in accordance with ASTM-D92.

Whenever reference is made to the average particle size, the average particle size is determined in accordance with ISO 13320 or ASTM D4464, which specify methods for particle size analysis using laser diffraction or dynamic light scattering (DLS). These standards are typically used by manufacturers for characterizing particle size.

For the step of a sonication, a standard ultrasonication of a frequency of about 20 kHz may be used.

Stability of nanoparticles in nanofluids may be characterized in various manners. The following options or combinations thereof for examining stability may be used:

Visual Sedimentation: Samples are monitored for nanoparticle aggregation or settling over time under static conditions, both immediately after preparation and over several days;

Laser Scattering (Tyndall Effect): Laser scattering confirms the homogeneous distribution of nanoparticles. The diffraction of light through nano-oil samples indicates the presence of nanoparticles, whereas pure oil shows no diffraction:

Extended Stability Monitoring: Over a month of static storage, no phase separation or sedimentation of nanoparticles was observed, indicating excellent stability;

Performance Under Operational and Extreme Conditions: Nano-oils maintain stability under flow conditions and across a broad temperature range, from boiling point to pour point; and/or Properties and Performance: Stability is further validated by measuring properties like viscosity, thermal conductivity, and thermal performance, all of which remain consistent over time and under varying conditions.

The terms "nanoparticle" and "nanoparticle(s)" are used interchangeably herein.

As used herein, nanoparticles being dispersible in the nanofluid according to the first aspect of the present disclosure may have an average particle size ranging from about 1 nm to about 2000 nm in the broadest sense.

As used herein, the term "fatty acid" in particular comprises carboxylic acids having at least one or at most one carboxyl group and a total length of C6 to about C18, more preferably C12 to C18.

As used herein, the term "fatty alcohols" in particular comprises alcohols which have one or two hydroxyl groups and a total length of C6 to C10, preferably C6 to C8.

The terms Ma.-% and wt % are used interchangeably herein and the percentages usually refer to the total mass of the nanofluid, unless indicated otherwise.

As used herein, the terms "comprise", "have", "include", "involve", "contain" are interchangeably used and have the common meaning in the field of patent law, namely in terms of an open formulation in which all features named after the term are present, but there can be more unwritten features as long as it is technically possible and/or sensible. On the contrary, the term "consisting of" has the meaning of a closed formulation, meaning that all features following the term are present, but no further features are present. In addition, as commonly used in the field of patent law, the terms "may", "typically", "optionally", "preferably" etc. denote features or statements which may or may not be involved, i.e. which are not necessarily mandatory for the technical subject-matter.

As used herein, the term "about" may designate a deviation of a numerical value of ±10%, optionally ±5%, more optionally ±1%.

DETAILED DESCRIPTION OF THE INVENTION

Nanofluid

According to a first aspect, the present disclosure is directed to a nanofluid for heat transfer comprising:

nanoparticles;

a dielectric oil in which the nanoparticles are dispersed; and a stabilizer, wherein the nanoparticles are surface-modified by the stabilizer and a mass ratio of stabilizer to nanoparticles ranges from about 0.01 to about 110 and the stabilizer having a molar mass of less than 300 g/mol.

Due to the surface modification by the stabilizer in the indicated mass ratio of about 0.01 to about 110 and 300 g/mol, it has been found out that a particularly advantageous for the interaction between the nanoparticles (surface-modified) and the dielectric oils in order to form a stable dispersion of the nanoparticles within the oils. Without wishing to be bound by a theory, it is stated that the stabilizer functions by adsorbing or bonding to the surface of the nanoparticles, creating a protective layer that the stabilizer modifies the surface energy of nanoparticles, reducing attractive forces between them, which prevents them from clumping together and by creating a barrier between nanoparticles, the stabilizer enhances their ability to remain evenly dispersed within a medium, such as a dielectric oil. Further features about the stabilizer and the nature of the surface-modification are discussed hereinbelow in more detail. However, without wishing to be bound by a particular theory, the stabilizer is capable of forming a spontaneous stabilizer layer of molecules at the nanoparticle-dielectric oil interfaces. The stabilizers are in particularly characterized in that they have a greater affinity for the nanoparticles than for the oils. Without wishing to be bound by a theory, it is believed that such affinity balance enables to form an interfacial layer that enhances dispersibility without requiring traditional surfactants or block co-polymers, such as SDS—sodium dodecyl sulfate, cetyltrimethylammonium bromide (CTAB)), block co-polymers surfactants like polyvinyl alcohol (PVA), or block copolymers like Pluronic (poloxamer) and functionalized block copolymers (e.g., PS-b-PEO). These traditional surfactants or block-copolymers are typically not comprised in the nanofluid according to the present disclosure.

In addition, the particular range of about 0.01 to about 110 and a molar mass of the stabilizer of less than 300 g/mol has been surprisingly found to be advantageous, because the right balance between nanoparticle dispersion and stabilizer coverage is achieved. Too little stabilizer may fail to adequately coat the nanoparticles, while too much stabilizer may interfere with the oil's properties. Also, a mass of stabilizer being higher than 300 g/mol may be disadvantageous in view of stability, viscosity and heat transfer characteristics.

A mass ratio of stabilizer to particles ranges from about 0.01 to about 110, preferably from about 0.1 to about 20, more preferably from about 0.1 to about 10. Alternatively, or in addition, the mass ratio may also range from about 90 to about 110, preferably about 95 to about 105. The molar mass of the stabilizer is less than 300 g/mol, in other words more than 0 g/mol to less than 300 g/mol. Preferably, the molar mass of the stabilizer ranges from about 100 g/mol to about 295 g/mol, more preferably from about 120 g/mol to about 250 g/mol.

While the stability of the nanoparticles is enhanced, which is a crucial advantage of the present disclosure over the prior art compositions, based on the above features and observations, at the same time, they exhibit excellent thermal characteristics, viscosity characteristics, flash point characteristics as well as breakdown voltage characteristics as compared to the dielectric oils without these nanoparticles. For example, viscosity of the nanofluids of the present disclosure is typically not increased and most of the times even decreased compared to their base oils, while the viscosity rather increases in conventional formulations.

Embodiments following hereinafter are combinable with each other, unless indicated otherwise.

Therefore, the nanofluids of the first aspect of the present disclosure may be, asides of structural features below, be characterized by the following embodiments relating to parameters which are, in turn related to the technical effects exhibited by the nanofluids of the present disclosure over at least a dielectric oil without stabilizer and nanoparticles.

In certain embodiments, the nanofluid has a thermal conductivity which is increased by at least 10%, such as about 10% to about 25%, preferably about 10% to about 20%, compared to the dielectric oil without nanoparticles and stabilizer. In particular, the thermal conductivity of the nanofluid ranges from about 0.16 W/mK to about 0.17 W/mK.

In certain embodiments, the nanofluid has a kinematic viscosity which is reduced by at least 20%, such as about 20 to about 27%, compared to the dielectric oil without nanoparticles and stabilizer. In particular, the nanofluid has a viscosity ranging from about 3 to about 20 cSt (centistokes), preferably from about 4.0 to about 8 cSt, at 40° C.

In certain embodiments, the nanofluid has a density which is increased by at least 1%, such as about 1% to about 2% compared to the dielectric oil without nanoparticles and stabilizer. In particular, the nanofluid has a density ranging from 0.78 to about 0.8 at 40° C.

In certain embodiments, the nanofluid has a specific heat capacity which is increased by at least 6%, such as about 6% to about 10%, compared to the dielectric oil without nanoparticles and stabilizer. In particular, the specific heat capacity of the nanofluid ranges from 2400 J/kg K to 2500 J/kg K.

In certain embodiments, the nanofluid has a flash point which is reduced by at least about 10° C., such as about 15° C. to about 25° C. compared to the dielectric oil without nanoparticles and stabilizer. In particular, the flash point of the nanofluid ranges from about 165° C. to about 155° C. This may be e.g. obtained by combining nanoparticles with viscosity modifiers, such as viscosity reducing agents, e.g. glycol ethers.

In other embodiments, the addition of nanoparticles and stabilizers increases the flash point of the dielectric oil, such as about 15° C. to about 25° C. compared to the dielectric oil without nanoparticles and stabilizer. In particular, the flash point of the nanofluid ranges from about 205° C. to about 155° C., preferably from about 165° C. to about 155° C. It could be surprisingly found that the addition of an ester, such as a fatty acid alkyl ester, may increase the flash point. A fatty acid alkyl ester, such as a fatty acid methyl ester, may be present in a content ranging from about 5 Ma.-% to about 15 Ma.-%, preferably about 7.5 Ma.-% to about 12 Ma.-%, with respect to a total amount of a nanofluid. In addition, it has been surprisingly found that an addition of a fatty acid alkyl ester is capable of contributing to the reduction of the viscosity as further discussed hereinbelow.

Therefore, depending on the application, the flash point can be suitably controlled, i.e. increased or reduced, by the exact composition of the nanofluid.

In certain embodiments, the nanofluid has a breakdown voltage which is increased by at least 40 KV, such as about 45 KV to about 50 KV. In particular, the breakdown voltage of the nanofluid ranges from about 60 to about 80 KV.

In terms of structural embodiments, several optional sub-aspects of the present disclosure are set forth below.

In certain embodiments, the stabilizer is attached to the nanoparticles by a chemical bond. This is a possible way, the surface-modification by the stabilizer according to the first aspect of the present disclosure works. Such chemical bond can for example result from surface —OH groups of the nanoparticles and corresponding chemical functional groups of the stabilizer which result in a nanoparticle-stabilizer bond by virtue of an oxygen atom bond to the surface of the nanoparticle and to the functional group of the stabilizer. The formation of the chemical bond increases the affinity of the stabilizer with respect to the nanoparticle. A functional group, such as a nonpolar group, can be attached to the functional group chemically bonding to the surface of the nanoparticle, which results in good solubility of the nanoparticle in the nonpolar dielectric oil.

Alternatively, in certain embodiments, a surfactant can be physically attached to the surface of the nanoparticle. This is another possible way, the surface-modification by the stabilizer according to the first aspect of the present disclosure works. Therefore, without wishing to be bound by theory, it is stated that the surfactant is attached to the surface of the nanoparticle by electrostatic attraction forces. The attachment to the surface of the particle may be by a polar group of the surfactant, while the surfactant may contain a nonpolar group for interacting with the dielectric oil due to its nonpolar nature. The surfactant may be physically attached to the surface of the nanoparticle(s), if another stabilizer is already chemically bond to the surface of the nanoparticles. In addition, the surfactant may be attached to the surface of the nanoparticle(s) without the presence of another stabilizer chemically bond thereto.

Types of stabilizers, being chemically bond and/used as surfactants, in terms of their chemical structure will be discussed hereinbelow. In particular, applying to all embodiments of the stabilizer herein, the stabilizer may be non-ionic.

In certain embodiments, the nanoparticles are selected from the group consisting of alumina, titania, silicon dioxide, graphene, graphene oxide, carbon nanotubes, manganese dioxide, boron nitride, and combinations thereof. More preferably, the nanoparticles are selected from the group consisting of alumina and titania or combinations thereof. In particular, without wishing to be bound by a theory, it is stated that oxidic nanoparticles or nanoparticles carrying polar groups, such as —OH groups in the case of oxidic nanoparticles, on the surface can be stabilized by modifying the surface with the stabilizer and rendering the surface rather nonpolar to be easily dispersed in the nonpolar dielectric oil of the nanofluid. In preferred embodiments, the nanoparticles are alumina nanoparticles. In another preferred embodiment, the nanoparticles are boron nitride nanoparticles, more preferably hexagonal boron nitride nanoparticles. In a further preferred embodiment, the nanoparticles are manganese dioxide nanoparticles. Additionally or alternatively, in some embodiments, the nanoparticles may be titania nanoparticles.

In certain embodiments, a concentration of the nanoparticles ranges from about 0.0001 Ma.-% to about 10%

Ma.-%, preferably from 0.001 Ma.-% to about 5 Ma.-% or from 0.5 Ma.-% to about 3 Ma.-%, with respect to a total mass of the nanofluid. In particular, due to the excellent stabilization of using a stabilizer according to the present disclosure, also stable dispersions of nanoparticles, having the advantageous effects disclosed herein with increased concentrations are enabled.

In certain embodiments, the nanoparticles may be stabilized by an additional organic surface modifier attached to the nanoparticle(s), wherein the additional organic surface modifier is chemically bond to the nanoparticles, wherein optionally the additional organic surface modifier comprises a monomeric and oligomeric form of acrylic acid. In particular, the additional organic surface modifier may be different from the stabilizer. Possible binding mechanisms of the additional organic surface modifier have already been discussed above with respect to the stabilizer being chemically bond to the surface of the nanoparticle(s). In case the additional organic modifier is different from the stabilizer, the stabilizer can also be bond chemically to the surface of the particle or the stabilizer can be a surfactant being physically bond to the surface of the nanoparticle already having the organic surface modifier chemically attached. For example, the organic surface modifier may involve a polar group, such as an organic acid group binding to the surface of the nanoparticle(s) by virtue of a reaction between the —OH group of the nanoparticle and the acid group (i.e. an esterification). The polar group may be an organic acid, hydroxyl groups one or more, fatty alcohols, carboxyl acid group. The additional organic surface modifier may also involve a nonpolar group attached to the polar group for the interaction with the oil or the stabilizer.

In preferred embodiments, the nanoparticle involves an additional organic surface modifier chemically bond to the nanoparticles' surface via the polar group and a stabilizer in the form of a surfactant in the indicated mass ratio being physically bond to the nanoparticle's surface.

In most preferred embodiments, the nanoparticles comprise alumina with a chemically bond additional organic surface modifier, wherein the additional organic surface modifier comprises a monomeric and oligomeric form of acrylic acid. In this case, the additional stabilizer may be a surfactant and physically bond to the nanoparticle(s). In particular, surface-modified alumina particles as disclosed in U.S. Ser. No. 10/011,705B2, which is incorporated herein by reference, may be used for the nanofluid. In this case, a stabilizer as defined hereinbelow may be used. For example, the stabilizer may encompass a glycol ether.

In certain embodiments, the stabilizer is selected from the group consisting of glycol ethers, such as dipropylene glycol n-butyl ether (DPnB), dipropylene glycol propyl ether; organic solvents comprising an OH-group; fatty alcohols, such as 1-octanol, 1,2 octanediol, hexanol; fatty acids, such as lauric acid; hydrophilic-hydrophobic molecules, and combinations thereof. In preferred embodiments, the stabilizer is a glycol ether. In the preferred embodiment, the nanoparticles may include alumina and involve an additional organic surface modifier as disclosed above. These stabilizers particularly have a high affinity to the nanoparticle surface (also if covered with the additional organic surface modifier) but also lead to stable nanofluids connected with all technical advantages as discussed above due to the improved interaction with the surface-modified nanoparticles and the dielectric oil.

In preferred embodiments, the present disclosure is directed to a nanofluid for heat transfer comprising:

nanoparticles;

a dielectric oil in which the nanoparticles are dispersed; and a stabilizer, wherein the nanoparticles are surface-modified by the stabilizer and a mass ratio of stabilizer to nanoparticles is ranges from about 0.01 to about 110 and the stabilizer having a molar mass of less than 300 g/mol, wherein the stabilizer is a glycol ether and/or a fatty alcohol.

In certain embodiments, the present disclosure is directed to a nanofluid for heat transfer comprising:

nanoparticles;

a dielectric oil in which the nanoparticles are dispersed; and a stabilizer, wherein the nanoparticles are surface-modified by the stabilizer and a mass ratio of stabilizer to nanoparticles is ranges from about 0.01 to about 110 and the stabilizer having a molar mass of less than 300 g/mol, wherein the stabilizer is a glycol ether. In this context, it has been surprisingly discovered that the stabilizer does not only lead to a significant stabilization of the nanofluid, but also reduces the viscosity compared to the dielectric oil without nanoparticles.

In certain embodiments, the present disclosure is directed to a nanofluid for heat transfer comprising:

nanoparticles;

a dielectric oil in which the nanoparticles are dispersed; and a stabilizer, wherein the nanoparticles are surface-modified by the stabilizer and a mass ratio of stabilizer to nanoparticles is ranges from about 0.01 to about 110 and the stabilizer having a molar mass of less than 300 g/mol, wherein the stabilizer is a fatty alcohol. In this context, it has been surprisingly discovered that the stabilizer leads to a significant stabilization of the nanofluid. A fatty acid alkyl ester, such as a fatty acid methyl ester, may be added, preferably in a content ranging from about 5 Ma.-% to about 15 Ma.-% with respect to a total mass of the nanofluid. The fatty acid alkyl ester may surprisingly further reduce the viscosity together with the fatty alcohol and, at the same time, an increase of flash point may be surprisingly achieved.

In certain embodiments, the nanofluid is obtained or obtainable by the methods comprising the steps of (a1) mixing the nanoparticles and the stabilizer in a stabilizer to nanoparticles mass ratio ranging from about 0.01 to about 110; and (a2) evaporating excess stabilizer to obtain nanoparticles to which the stabilizer is attached; or (b1) adding stabilizer to a dielectric oil;

(b2) adding and dispersing nanoparticles to the composition of (b1) and dispersing the nanoparticles to obtain nanoparticles to which the stabilizer is attached, wherein a mass ratio of stabilizer to nanoparticles is controlled to be ranging between about 0.01 to about 110.

More details about the production method is found below in the section "method of producing the nanofluid. In particular, by using steps (a1) and (a2) or (b1) and (b2) achieves a specific surface-modification of the nanoparticles by the arrangement of the stabilizer on the surface of the nanoparticles such that the surface-modified nanoparticles are highly stable and dispersible within any dielectric oil. In preferred embodiments, the particles used for steps (a1) and (a2) or (b1) and (b2) include the additional organic surface modifier being chemically bond to the nanoparticles' surface. In this case, the stabilizer may be physically bond to the already chemically modified surface. In a more preferred embodiment, the nanoparticles are composed of alumina and more preferably, the additional organic surface modifier comprises a monomeric and oligomeric form of acrylic acid.

In certain embodiments, dielectric oils may be classified as oils and fluorocarbon. Oils may be selected from the list consisting of mineral/white oils, synthetic poly alpha olefins (PAOs), synthetic gas to liquids (GTLs) synthetic/natural esters and silicon oils or combinations thereof. In preferred embodiments, the dielectric oil is selected from the group consisting of dielectric oil is selected from the group consisting of mineral oils, paraffin oils, vegetable oils, polyaromatic poly-alpha-olefins oils (PAO), silicone oils, natural esters, synthetic esters, synthetic oils, fluorocarbon oils and combinations thereof.

A volume content of the dielectric oil may range between about 30 Vol.-% to about 99 Vol.-%, optionally about 50 Vol.-% to about 99 Vol.-%, with respect to a total volume of the nanofluid.

In certain embodiments, the nanofluid further comprises a viscosity reducing agent dispersed therein. A use of the viscosity reducing agent may, depending on the concentration and type of agent, cause a reduction by at least 20%, such as about 20 to about 27%, compared to the dielectric oil without nanoparticles and stabilizer. In particular, the nanofluid has a viscosity ranging from about 3 cSt to about 20 cst, preferably from about 4.0 cSt to about 9 cSt, at 40° C. This brings advantages to the pumpability of the nanofluid which is usually a problem for known nanofluids. Due to the use of the viscosity reducing agent, it could even be surprisingly found that the viscosity is even reduced in comparison to the dielectric oil as such, which requires less energy for pumping the nanofluid in a heat transfer system than for pumping the oil. In preferred embodiments, the viscosity reducing agent is selected from the group consisting of a glycol ether, such as dipropylene glycol n-butyl ether (DPnB), diethylene glycol dibutyl ether (DEDB), a vegetable ester, a synthetic ester or a combination thereof. Preferably, the viscosity reducing agent is a glycol ether. Additionally, the viscosity reducing agent may be at the same time capable of modifying the flash point of the dielectric oil. A viscosity reducing agent may be present in a content ranging from about 0.1 Ma.-% to about 30 Ma.-%, preferably from about 5 Ma.-% to about 20 Ma.-%, with respect to a total mass of the nanofluid.

In certain embodiments, the viscosity reducing agent and the stabilizer may be different compounds. However, the viscosity reducing agent and the stabilizer may be the same molecule. In other words, the stabilizer attached to the surface of the nanoparticles may also be capable of reducing the viscosity of the nanofluid. In preferred embodiments, the viscosity reducing agent and stabilizer may be selected from the group consisting of glycol ethers, organic solvents comprising an —OH group; fatty alcohols and fatty acids. In particular, the organic solvents comprising the polar —OH group is capable of attaching to the surface to the nanoparticles in order to modify it.

In certain embodiments, a viscosity reducing agent and a flash point enhancing compound may be the same molecule. In preferred embodiments, such a molecule may be selected from the group consisting of vegetable esters or synthetic esters or combinations thereof. Sub-types of such esters have been named above and will not be repeated for the sake of conciseness.

In certain embodiments, wherein the average size of the nanoparticles ranges between about 1 nm and about 2000 nm. In preferred embodiments, the average size may range between about 10 nm to about 500 nm, preferably 10 nm and about 200 nm, more preferably about 50 to about 200 nm.

In certain embodiments, the nanofluid may comprise an antioxidant. In certain embodiments, the antioxidant is selected from the group consisting of phenolic antioxidants, aromatic amines, sulfur-containing antioxidants, and metal deactivators.

Alternatively or in addition, the nanofluid may comprise a corrosion inhibitor. Suitable corrosion inhibitors are known to the skilled person.

The antioxidant and corrosion inhibitor may be present in a combined amount ranging from about 0.01 Ma.-% to about 5 Ma.-% with respect to a total mass of the nanofluid composition.

In combination with the antioxidant and the corrosion inhibitor, the nanofluid may also involve a dispersant. Such combination helps increasing the thermal stability and corrosion resistance of the nanofluid. Suitable dispersants are known to the skilled person.

In general, embodiments shown in this paragraph denoted with "in certain embodiments" and their sub-embodiments, can be combined together without limitation, unless indicated otherwise.

Embodiments not mentioned in this section but in the following sections relating to the second, third and fourth aspect are equally applicable and combinable with the first aspect. The same also applies to technical effects not mentioned in this section.

Method of Producing the Nanofluid

According to a second aspect, the present disclosure is directed to a method for producing a nanofluid according to the first aspect, comprising the method comprising or consisting of the steps of:

(a1) mixing the nanoparticles and the stabilizer in a stabilizer to nanoparticles mass ratio ranging from about 0.01 to about 110; and (a2) evaporating excess stabilizer to obtain nanoparticles to which the stabilizer is attached; or (b1) adding stabilizer to a dielectric oil;

(b2) adding and dispersing nanoparticles to the composition of (b1) and dispersing the nanoparticles to obtain nanoparticles to which the stabilizer is attached, wherein a mass ratio of stabilizer to nanoparticles is controlled to be ranging between about 0.01 to about 110.

Both alternative methods, be it the combination of steps (a1) and (a2) "method (a)" or the combination of steps (b1) and (b2) "method (b)" are alternative methods for producing nanofluids according to the present disclosure with the advantageous technical effects described herein.

The dispersion of nanoparticles either in method (a), involving steps (a1) and (a2) or method (b), involving steps (b1) and (b2) may involve ultrasonication using a sonicator. A frequency of the ultrasonication for dispersing the nanoparticles may range between about 10 kHz and about 30 kHz. The ultrasonication may take place at the end of step (a1). The ultrasonication at the above-mentioned frequency range may have a duration between about 1 to about 10 hours. Furthermore, ultrasonication may take place at the end of step (a2), which is also referred to as "final mixing". In this case, the ultrasonication may take place for a duration of about 1 to about 4 hours in the above-mentioned frequency range.

Step (a2) may involve an evaporation of the excess stabilizer at a temperature ranging from about 20° C. to about 100° C. in order to generate nanoparticles being surface-modified by the stabilizer. In addition a viscosity reducing agent may be added in step (a2).

The ultrasonication may also take place at the end of step (b2). In this case the ultrasonication may be controlled at the above-mentioned frequency range for about 1 to about 3 hours. A viscosity reducing agent may be added in or before step (b1).

In certain embodiments, the nanoparticles used in step (a1) and/or step (b2) are attached to an additional organic surface modifier, wherein the additional organic surface modifier is chemically bond to the nanoparticles, wherein optionally the additional organic surface modifier comprises a monomeric and oligomeric form of acrylic acid. The attachment to the additional organic modifier can take place before the steps of the alternative methods.

Furthermore, the other components, such as the viscosity reducing agents, may be added at any time of the production methods (a) or (b). Preferably they are added to the dielectric oil before step (a1) or (b1).

Embodiments not mentioned in this section but in the preceding and following sections relating to the first, third and fourth aspect of the present disclosure are equally applicable and combinable with the second aspect of the present disclosure. They will merely not be repeated for the sake of conciseness. The same also applies to technical effects not mentioned in this section.

Method of Recycling the Nanofluid

According to a third aspect, the present disclosure is directed to a method of recycling nanoparticles of a nanofluid according to the first aspect, the method comprising the steps of:

(a) destabilizing the nanoparticles dispersed in the dielectric oil;

(b) extracting the destabilized nanoparticles from the dielectric oil;

(c) preparing a new nanofluid with the extracted particles in step (b).

The step of destabilizing the nanoparticles dispersed in the dielectric oil can for example take place by changing the solvent environment which also leads to the extraction of the nanoparticles. It has to be stated that usually the surface-modified nanoparticles, in accordance with the first aspect of the present disclosure, are not chemically changed in that far that they need to be newly prepared with respect to their surface modification with the stabilizer.

In particular, adding a solvent in step (a) may comprise adding a polar solvent selected from the group consisting of ethanol, methanol, acetone, acetic acid and water and combinations thereof. Adding such polar to the nanofluid and stir or sonicate to ensure thorough mixing that weakens the interaction between the nanoparticles and the stabilizer. By changing the solvent environment would shifting the polarity and leads the instability to the medium and in some cases recrystallize the stabilizer from fluid will disrupt the stable dispersion of nanoparticles in the dielectric oil. In results the nanoparticles to aggregate or precipitate, making separation from the oil matrix while maintaining their structural and functional integrity. The solvent ensure effectively destabilizes the nanoparticles but does not chemically alter their stabilizer or surface coating and the solvent should be easily separable from both the nanoparticles and the oil.

Step (b) may be carried out by utilizing a solvent-extraction process where a solvent dissolves the oil or surfactant but leaves the nanoparticles behind. Separate aggregated nanoparticles and wash with fresh solvent and dry them to remove any residual solvent or moisture. This process ensures recovered the nanoparticles free of most oil impurities. The recycled nanoparticles perform comparably to their original state, promotes the reusability of nanomaterials and reducing environmental waste.

Using this recycling protocol according to the third aspect of the present disclosure, it has been surprisingly found that the nanoparticles of the nanofluid of the present disclosure can be efficiently recycled and used for another nanofluid containing a dielectric oil in a stable manner with all the advantages described herein.

Embodiments not mentioned in this section but in the preceding and following sections relating to the first, second and fourth aspect are equally applicable and combinable with the third aspect. They will merely not be repeated for the sake of conciseness. The same also applies to technical effects not mentioned in this section.

Uses of the Nanofluid

According to a fourth aspect, the present disclosure is directed to a use of a nanofluid according to the first aspect as a coolant for a server or a data center, such as immersion cooling of a data center severs and/or direct chip cooling applications, as a coolant for power electronics, as a coolant for an engine cooling system, as a coolant in a heat exchanger, as a coolant in a solar thermal power plant, as a coolant in a transformer, or as a coolant in a high-performance computing system, or as immersion cooling of batteries, such as electric vehicle batteries and/or electrical power storage batteries, and/or power trains.

In a preferred embodiment, the nanofluid according to the first aspect of the present disclosure is used as a coolant for a server or a data center.

Embodiments not mentioned in this section but in the preceding sections relating to the first, second and third aspect of the present disclosure are equally applicable and combinable with the fourth aspect of the present disclosure. They will merely not be repeated for the sake of conciseness. The same also applies to technical effects not mentioned in this section.

EXAMPLES

The following measurement and other protocols are used for the following examples:

Thermal conductivity: Measured using Thermtest Transient Hot-Wire (THW-L2) which is a portable thermal conductivity meter for measurement of liquids adhering to ASTM D7896-19.

Flash Point (for oils): ASTM D93 closed cup and ASTM D92 open cup (Cleveland Flash and Fire point tester CLA 5 from Anton Paar)

Kinematic viscosity: ASTM D445 (Cannon Fenske viscometer tube)

Density: ASTM D4052 (Anton Paar Digital density meter)

Breakdown voltage: IEC 60156 (Megger Automatic Oil Breakdown Tester OTS80AF-EU)

Sonicator: As standard ultrasonication (20 kHz frequency)

The following chemicals used in the examples are given below:

Dipropylene Glycol Monobutyl Ether, CAS No: 29911-28-2

Methanol—CAS No: 67-56-1

Modified aluminum oxide ($Al_2O_3$) nanoparticles—CAS no. 1344-28-1a)

Mineral GTL oils: CAS No: 848301-69-9

Poly α-olefin synthetic oil (PAO-2) oil—CAS No: 68649-11-6

2, 6-di-tert-butyl-4-methylphenol—CAS No: 128-37-0

2,4,6-Triallyloxy-1,3,5-triazine—CAS No: 101-37-1

1,2-Octanediol—CAS No: 1117-86-8

1-Octanol—CAS No: 11187-5

Hexagonal boron nitride (h-BN) nanoparticles—CAS No: 10043-11-5

Geraniol—CAS No: 106-24-1

Example 1

Preparing the Alumina-Based Nanofluid (Nano-Oil) Using Mineral Oil as Base Liquid and Additional Oils, Viscosity Modifier, Anti-Corrosion and Anti-Oxidant Agents to Improve Thermal and Dielectric Performance of Base Fluid To disperse modified aluminum oxide ($Al_2O_3$) nanoparticles (modified by adding carboxyl groups on the surface of the alumina particles) in the base fluid with pure mineral oil or mixture of mineral oil is prepared from the following raw materials in parts by weight: 70 parts of mineral insulating oil, 19 parts of Poly α-olefin synthetic oil (PAO-2) oil, 8 parts of dipropylene glycol monobutyl ether as the stabilizer, 1 parts of modified 200 nm aluminum oxide ($Al_2O_3$), 1 parts of antioxidant is 2, 6-di-tert-butyl-4-methylphenol and 1 part of corrosion inhibitor is 2,4,6-Triallyloxy-1,3,5-triazine.

The new suspension was sonicated for 1-2 hours to ensure proper dispersion of the nanoparticles. The Sonication continued for a total of about 30 minutes. A very homogeneous and stable white suspension was obtained at the end of sonication.

Nanoparticle homogeneity and stability in the in the nanofluid was visually tested using a laser beam. No clear phase separation between solid and liquid or sedimentation of nanoparticles at the bottom or on the walls of the glass container was observed after a monitoring period of over three months with nano-oils in static condition indicating excellent stability.

The suspension does not become unstable when the temperatures rises up to boiling point or falls to pour point. The results show that the alumina nano-oils feature excellent stability and, therefore, can be a promising candidate for practical applications requiring long-term lifetime.

With the above formulation, properties as shown in table-EX1 were measured and compared to the base mineral oil. Thermal conductivity was measured at 40° C., kinematic viscosity was measured at 40° C. and so was the density and breakdown voltage was measured at 20° C.

TABLE-EX1

Properties of nanofluids versus their base oils (without nanoparticles)

| Property (unit) | Standard | Base oil | Nano-oil (nanofluid) |
|---|---|---|---|
| Thermal conductivity (W/mK) | ASTM D7896-19 | 0.142 | 0.168 |
| Kinematic Viscosity (cSt) | ASTM D445 | 9.9 | 6.6 |
| Density (g/cm³) | ASTM D4052 | 0.792 | 0.798 |
| Specific heat capacity (J/kgK) | — | 2274 | 2450 |
| Flash point (° C.) | ASTM-D92 | >190 | >150 |
| Breakdown Voltage (KV) | IEC 60156 | 30 | 72 |
| Color | — | Transparent | Translucent white |
| Odor | — | Characteristic | Characteristic |

Additionally, FIG. 1 (upper graph) shows heater temperatures a different input powers for the mineral base oil versus the nano-oil (i.e. the nanofluid). The lower graph in FIG. 1 shows a temperature difference (Heater temperature—oil temperature near the heater surface) at different input powers for mineral and nano-oil. The lower the temperature difference, the better the thermal resistance and therefore better the heat transfer coefficient.

In this case, the heat transfer improvement is evident, and the flash point is still within acceptable limits while the nano-oil is offering significant improvements in thermal efficiency and breakdown voltage.

Example 2

Preparing the Alumina-Based Nanofluid (Nano-Oil) Using PAO-2 Oil as Base Liquid and Additional Oils, Viscosity Modifier, Anti-Corrosion and Anti-Oxidant Agents to Improve Thermal and Flash Point Performance of Base Fluid To disperse modified aluminum oxide ($Al_2O_3$) nanoparticles (modified by adding carboxyl groups on the surface of the alumina particles) in the base fluid with pure PAO-2 oil or mixture of PAO-2 oil is prepared from the following raw materials in parts by weight: 88 parts of Poly α-olefin synthetic oil (PAO-2) oil, 9.75 parts of fatty acid alkyl ester, 1 parts of modified 200 nm aluminum oxide ($Al_2O_3$), 0.25 parts of 1,2-octanediol as the stabilizer, 1 parts of antioxidant is 2, 6-di-tert-butyl-4-methylphenol and 1 part of corrosion inhibitor is 2,4,6-Triallyloxy-1,3,5-triazine.

The new suspension was sonicated for 1-2 hours to ensure proper dispersion of the nanoparticles. The Sonication continued for total of about 30 minutes. A very homogeneous and stable white suspension was obtained at the end of sonication.

Nanoparticle homogeneity and stability in the oils was visually tested using a laser beam. No clear phase separation between solid and liquid or sedimentation of nanoparticles at the bottom or on the walls of the glass container was observed after a monitoring period of over three months with nano-oils in static condition indicating excellent stability.

The suspension does not become unstable when the temperatures rises up to boiling point or falls to pour point. The results show that the alumina nano-oils feature excellent stability and, therefore, can be a promising candidate for practical applications requiring long-term lifetime.

With the above formulation, properties as shown in table-EX2 were measured and compared to the base PAO-2 oil. Thermal conductivity was measured at 40° C., kinematic viscosity was measured at 40° C., density was measured at 40° C. and breakdown voltage was measured at 20° C.

TABLE-EX2

Properties of nanofluids versus their base oils (without nanoparticles)

| Property (unit) | Standard | Base oil | Nano-oil (nanofluid) |
|---|---|---|---|
| Thermal conductivity (W/mK) | ASTM D7896-19 | 0.145 | 0.154 |
| Kinematic Viscosity (cSt) | ASTM D445 | 5.2 | 5.2 |
| Density (g/cm³) | ASTM D4052 | 0.7820 | 0.7928 |
| Specific heat capacity (J/kgK) | — | 2120 | 2150 |

TABLE-EX2-continued

Properties of nanofluids versus their base oils (without nanoparticles)

| Property (unit) | Standard | Base oil | Nano-oil (nanofluid) |
|---|---|---|---|
| Flash point (° C.) | ASTM-D92 | 160 | 175 |
| Breakdown Voltage (KV) | IEC 60156 | 45 | 65 |
| Color | — | Transparent | Translucent white |
| Odor | — | Characteristic | Characteristic |

Figure 2:
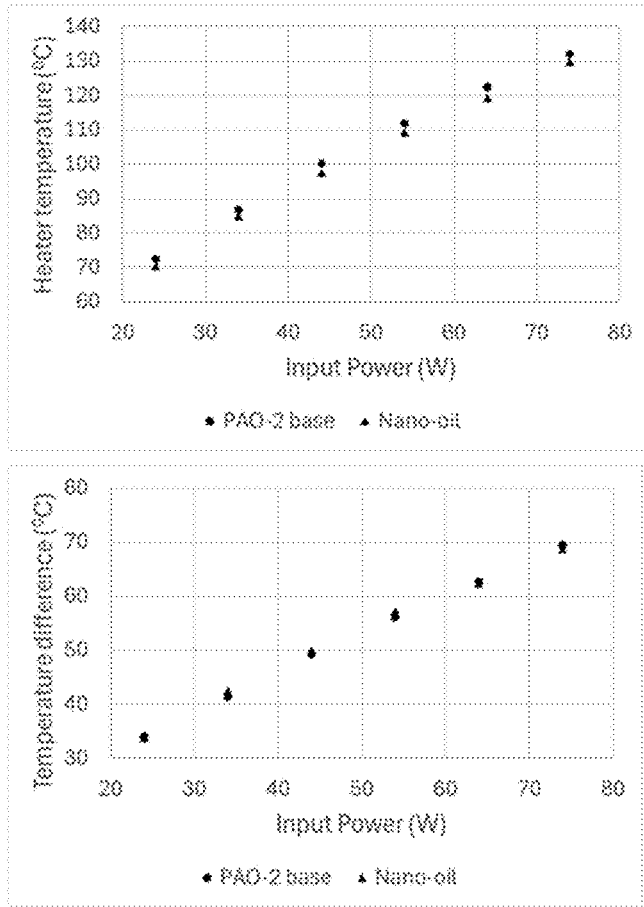
FIG. 2 shows a comparison of heater temperatures versus input power using the nanofluid according to Example 2 of the present disclosure versus its base oil for heat transfer (upper graph) and a comparison of temperature differences versus input power using the nanofluid according to Example 2 of the present disclosure versus its based oil (lower graph).

Additionally, FIG. 2 (upper graph) shows heater temperatures a different input powers for the PAO-2 oil versus the nano-oil (i.e. the nanofluid). The lower graph in FIG. 1 shows a temperature difference (Heater temperature—oil temperature near the heater surface) at different input powers for PAO-2 oil and nano-oil. The lower the temperature difference, the better the thermal resistance and therefore better the heat transfer coefficient.

In this case, the heat transfer improvement is present, and there is a significant improvement in flash point and breakdown voltage for the nanofluids, while thermal improvements are shown as well for them.

Example 3

Preparing the Alumina-Based Fluids Using Mineral Oil as Base Liquid and Additional Oils, Viscosity Modifier, Anti-Corrosion and Anti-Oxidant Agents to Improve Thermal Performance of Base Fluid-Nanoparticle Surface Modification Using 1-Octanol Carboxyl-modified aluminum oxide ($Al_2O_3$) nanoparticles are dispersed in a base fluid formulated from aliphatics (polyalphaolefin, PAO), mineral oil, esters, and their mixture. The stabilization of nanoparticles is achieved by adding 1-octanol, fatty alcohol, molecular formula $C_8H_{18}O$, Mw 130.23 g/mol) as the stabilizer, which carries a hydroxy group at the first position. The composition of the base fluid consists of the following raw materials by weight percentage: 20 wt % aliphatic oil (polyalphaolefin, PAO), 72 wt % mineral insulating oil, and 8 wt % of fatty acid alkyl ester. The nano-oil formulation comprises 98 wt % base fluid and 2 wt % 1-octanol surface-modified 200 nm aluminum oxide nanoparticles.

The two-step preparation process aims to create stable nanoparticle solutions in base fluids: 1) A mixture of nanoparticles in 1-octanol was agitated for 8 hours at temperatures up to 100° C. to form a homogeneous suspension and facilitate nanoparticle surface modification with 1-octanol.

The resulting suspension was then cooled to 25° C. and sonicated for 2 hours to achieve a uniform nanomaterial dispersion. Following this, the dispersion was maintained at an elevated temperature below the boiling point of 1-octanol (approximately 200° C. under normal conditions). The evaporation of 1-octanol resulted in a slurry, forming a white, paste-like mass; 2) The base fluid (mineral oil, aliphatics, or esters in the desired proportions), or pure liquids, was then mixed with a specified amount of the slurry to achieve a stable dispersion of carboxyl-modified aluminum oxide nanoparticles.

The stability of the dispersion was assessed visually by confirming the absence of nanoparticle sedimentation. No clear phase separation between solid and liquid or sedimentation of nanoparticles at the bottom or on the walls of the glass container was observed after a monitoring period of over three months with nano-oils in static condition indicating excellent stability.

With the above formulation, properties as shown in table-EX3 are being measured and will be compared to the base mineral oil.

TABLE-EX3

Properties of nanofluids versus their base oils (without nanoparticles)

| Property (unit) | Standard | Base oil | Nano-oil |
|---|---|---|---|
| Thermal conductivity (W/mK) | ASTM D7896-19 | 0.142 | 0.153 |
| Kinematic Viscosity (cSt) | ASTM D445 | 9.9 | 8.7 |
| Density (g/cm³) | ASTM D4052 | 0.792 | 0.794 |
| Flash point (° C.) | ASTM-D92 | >190 | 170 |
| Color | — | Transparent | Translucent white |
| Odor | — | Characteristic | Characteristic |

Example 4

The process involves destabilizing the nanoparticles within the dielectric oil to facilitate their extraction:

(a) destabilizing the nanoparticles dispersed in the dielectric oil:

The nano-oil created similar to Example 5 with the alumina nano particles instead of boron nitride particles can be separated by adding 20% volume of methanol and 30% volume of water to the nanofluid and stir or sonicate to ensure thorough mixing that weakens the interaction between the nanoparticles and the stabilizer. Changing the solvent environment shifts the polarity and leads to the instability of the medium and in some cases, surfactant recrystallisation will disrupt the stable dispersion of nanoparticles in the dielectric oil. As a result, the nanoparticles aggregate or precipitate, separating from the oil matrix while maintaining their structural and functional integrity. The solvent ensures effective destabilization of the nanoparticles but does not chemically alter their surface coating/modification therefore, the solvent is easily separable from both the nanoparticles and the oil.

(b) extracting the destabilized nanoparticles from the dielectric oil:

Utilizing a solvent-extraction process where a solvent dissolves in the oil or surfactant but leaves the nanoparticles behind. Nanoparticles are collected and these aggregated nanoparticles are washed with fresh solvent and then dried to remove all the solvent and residual moisture. This process ensures recovery of the nanoparticles free of most oil impurities. The recycled nanoparticles perform comparably to their original state, promoting the reusability of nanomaterials and reducing environmental waste.

Example 5

Preparing the Hexagonal Boron Nitride-Based Nanofluid Using Mineral Oil as Base Liquid and Additional Oils, Viscosity Modifier, Anti-Corrosion and Anti-Oxidant Agents to Improve Thermal and Dielectric Performance of Base Fluid.

To disperse hexagonal boron nitride (h-BN) nanoparticles in the base fluid with pure mineral oil or mixture of mineral oil is prepared from the following raw materials in parts by weight: 70 parts of mineral insulating oil, 18 parts of Poly α-olefin synthetic oil (PAO-2) oil, 8 parts of fatty acid methyl ester, 0.01 parts of <100 nm hexagonal boron nitride (h-BN), 1 parts of 1,2-Octanediol, 1 parts of Geraniol, 1 parts of antioxidant is 2, 6-di-tert-butyl-4-methylphenol and 1 part of corrosion inhibitor is 2,4,6-Triallyloxy-1,3,5-triazine.

The new suspension was sonicated for 1-2 hours to ensure proper dispersion of the nanoparticles. The Sonication continued for a total of about 30 minutes. A very homogeneous and stable white suspension was obtained at the end of Sonication. Nano particle homogeneity and stability in the oils was visually tested using a laser beam.

No clear phase separation between solid and liquid or sedimentation of nanoparticles at the bottom or on the walls of the glass container was observed after a monitoring period of over three months with nano-oils in static condition indicating excellent stability.

The suspension does not become unstable when the temperatures rises up to boiling point or falls to pour point. The results show that the alumina nano-oils feature excellent stability and, therefore, can be a promising candidate for practical applications requiring long-term lifetime.

With the above formulation, properties as shown in table-EX5 were measured and compared to the base mineral oil. Thermal conductivity was measured at 40° C., kinematic viscosity was measured at 40° C., density was measured at 40° C. and breakdown voltage was measured at 20° C.

TABLE-EX5

Properties of nanofluids versus their base oils (without nanoparticles)

| Property (unit) | Standard | Base oil | Nano-oil |
|---|---|---|---|
| Thermal conductivity (W/mK) | ASTM D7896-19 | 0.142 | 0.153 |
| Kinematic Viscosity (cSt) | ASTM D445 | 9.9 | 7.6 |
| Density (g/cm³) | ASTM D4052 | 0.792 | 0.795 |
| Specific heat capacity (J/kgK) | — | 2274 | 2310 |
| Flash point (° C.) | ASTM-D92 | >190 | 174 |
| Breakdown Voltage (KV) | IEC 60156 | 30 | 60 |
| Color | — | Transparent | Translucent white |
| Odor | — | Characteristic | Characteristic |

Figure 3:
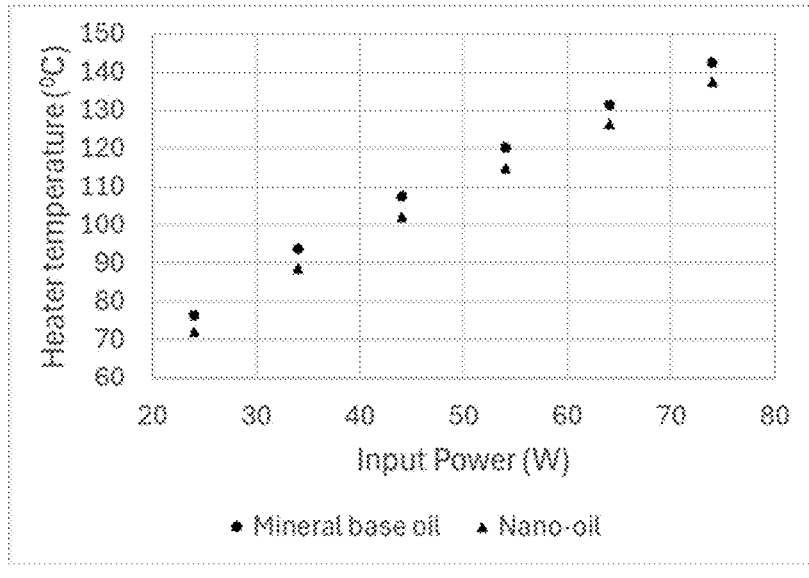
FIG. 3 shows a comparison of heater temperatures versus input power using the nanofluid according to Example 5 of the present disclosure versus its base oil for heat transfer (upper graph) and a comparison of temperature differences versus input power using the nanofluid according to Example 5 of the present disclosure versus its based oil (lower graph).
Figure 3:
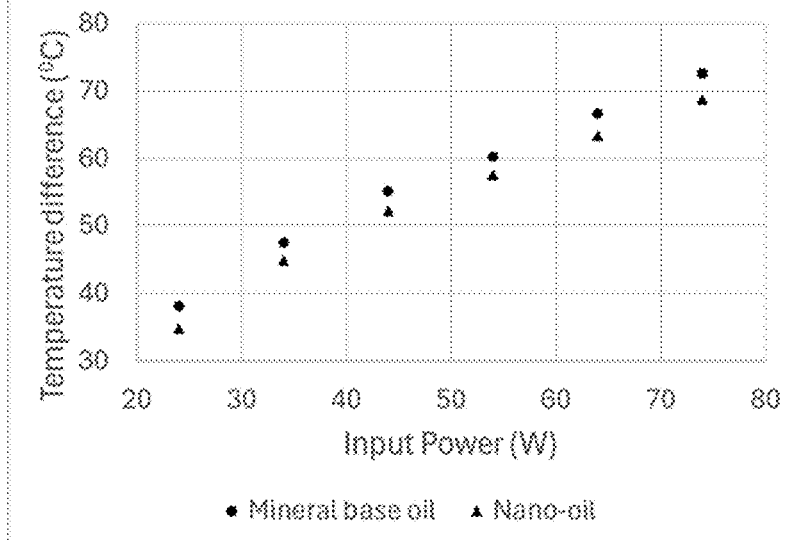

Additionally, FIG. 3 (upper graph) shows heater temperatures a different input powers for the mineral base oil versus the nano-oil (i.e. the nanofluid). The lower graph in FIG. 4 shows a temperature difference (Heater temperature—oil temperature near the heater surface) at different input powers for mineral oil and nano-oil. The lower the temperature difference, the better the thermal resistance and therefore better the heat transfer coefficient.

In this case, the heat transfer improvement for the nanofluids is present, and the flash point is in an acceptable range. The breakdown voltage and thermal efficiency for the nanofluids is significantly improved.

The invention claimed is:

1. A nanofluid for heat transfer comprising:

nanoparticles;

a dielectric oil in which the nanoparticles are dispersed; and a stabilizer, wherein:

the nanoparticles are surface-modified by the stabilizer, a mass ratio of stabilizer to nanoparticles ranges from about 0.01 to about 110, a molar mass of the stabilizer is less than 300 g/mol, and the nanoparticles are attached to an additional organic surface modifier, wherein the additional organic surface modifier is chemically bonded to the nanoparticles, wherein the additional organic surface modifier comprises a monomeric and oligomeric form of acrylic acid.

2. The nanofluid according to claim 1, wherein the stabilizer is attached to the nanoparticles by a chemical bond and/or the stabilizer is a surfactant physically adsorbed to the nanoparticle.

3. The nanofluid according to claim 1, wherein the nanoparticles are selected from the group consisting of alumina, titania, silicon dioxide, graphene, graphene oxide, carbon nanotubes, boron nitride, manganese dioxide and combinations thereof.

4. The nanofluid according to claim 1, wherein a concentration of the nanoparticles ranges from about 0.0001 Ma.-% to about 10% Ma.-% with respect to a total mass of the nanofluid.

5. The nanofluid according to claim 1, wherein the stabilizer is selected from the group consisting of glycol ethers, organic solvents comprising an OH-group, fatty alcohols, fatty acids, hydrophilic-hydrophobic molecules, and a combination thereof.

6. The nanofluid according to claim 1, wherein the nanoparticles are surface-modified by the stabilizer by a method comprising the steps of:

(a1) mixing the nanoparticles and the stabilizer in a stabilizer to nanoparticles mass ratio ranging from about 0.01 to about 110 and wherein the stabilizer has a molecular mass of less than 300 g/mol; and (a2) evaporating excess stabilizer to obtain nanoparticles to which the stabilizer is attached; or (b1) adding the stabilizer to the dielectric oil;

(b2) adding the nanoparticles to the composition of (b1) and dispersing the nanoparticles to obtain nanoparticles to which the stabilizer is attached, wherein the mass ratio of the stabilizer to the nanoparticles is between about 0.01 to about 110 and the molar mass of the stabilizer is less than 300 g/mol.

7. The nanofluid according to claim 1, wherein the dielectric oil is selected from the group consisting of mineral oils, paraffin oils, vegetable oils, poly-alpha-olefins (PAO), silicone oils, natural esters, synthetic esters, synthetic oils, fluorocarbon oils, and combinations thereof; and/or wherein a volume content of the dielectric oil ranges between about 30 Vol.-% to about 99 Vol.-% with respect to a total volume of the nanofluid.

8. The nanofluid according to claim 1, further comprising a viscosity reducing agent dispersed in the nanofluid.

9. The nanofluid according to claim 8, wherein the viscosity reducing agent is present in a content ranging from about 0.1 Ma.-% to about 30 Ma.-% with respect to a total mass of the nanofluid.

10. The nanofluid according to claim 1, wherein an average size of the nanoparticles ranges between about 1 nm and about 2000 nm.

11. The nanofluid according to claim 1, further comprising an antioxidant and/or a corrosion inhibitor.

12. A method of recycling a nanofluid according to claim 1, the method comprising the steps of:

(a) destabilizing the nanoparticles dispersed in the dielectric oil;

(b) extracting the destabilized nanoparticles from the dielectric oil; and (c) preparing a new nanofluid with the extracted particles in step (b).

* * * * *